(12) United States Patent
Zakrzewski

(10) Patent No.: US 7,937,343 B2
(45) Date of Patent: May 3, 2011

(54) METHOD AND APPARATUS FOR RANDOMIZED VERIFICATION OF NEURAL NETS

(75) Inventor: Radoslaw Romuald Zakrzewski, South Burlington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 1044 days.

(21) Appl. No.: 10/803,872

(22) Filed: Mar. 18, 2004

(65) Prior Publication Data

US 2004/0210417 A1   Oct. 21, 2004

Related U.S. Application Data

(60) Provisional application No. 60/458,693, filed on Mar. 28, 2003.

(51) Int. Cl.
*G06E 1/00* (2006.01)
*G06E 3/00* (2006.01)
*G06F 15/18* (2006.01)
*G06G 7/00* (2006.01)

(52) U.S. Cl. ........................................................ 706/18

(58) Field of Classification Search .................. 705/44; 382/116, 156; 706/15, 21, 26, 19, 34, 18; 700/28

See application file for complete search history.

(56) References Cited

U.S. PATENT DOCUMENTS 6,035,295 A * 3/2000 Klein ..................................... 1/1
6,473,746 B1 10/2002 Zakrzewski

OTHER PUBLICATIONS

Zakrzewski; 'Randomized approach to verification of neural networks': 2004, IEEE, 0-7803-8359, pp. 2819-2824.*
James O. Berger, Statistical Decision Theory and Bayesian Analysis—Second Edition, 1985, Springer-Verlag New York, Inc.
Russel E. Caflisch, Monte Carlo and quasi-Monte Carlo methods, 1998, Acta Numerica.
George S. Fishman, Monte Carlo: Concepts, Algorithms, and Applications, 1996, Springer-Verlag New York, Inc.
Jun S. Liu, Monte Carlo Strategies in Scientific Computing, 2001, Springer-Verlag New York, Inc.
Rajeev Motwani and Prabhakar Raghavan, Randomized Algorithms, 1995, Cambridge University Press.
Peyton Z. Peebles, Jr., Probability, Random Variables, and Random Signal Principles—Third Edition, 1993, McGraw-Hill, Inc.
M. Vidyasagar, Statistical Learning Theory and Randomized Algorithms for Control, Dec. 1998, IEEE Control Systems.
Eric W. Weisstein, Hypersphere, MathWorld—A Wolfram Web Resource, http://mathworld.wolfram.com/Hypersphere.html.
Radoslaw Romuald Zakrzewski, Verification of a Trained Neural Network Accuracy, 2001, IEEE.

* cited by examiner

*Primary Examiner* — Donald Sparks
*Assistant Examiner* — Peter Coughlan
(74) *Attorney, Agent, or Firm* — Muirhead and Saturnelli, LLC

(57) ABSTRACT

Described are techniques for using statistical analysis to reduce the number of samples required in accordance with statistical analysis confidence intervals to verify correctness of a component. These techniques may be used in verification of a neural network or other hardware or software component.

18 Claims, 4 Drawing Sheets

US 7,937,343 B2

METHOD AND APPARATUS FOR RANDOMIZED VERIFICATION OF NEURAL NETS

RELATED APPLICATIONS

This application claims priority to U.S. provisional patent application No. 60/458,693, filed on Mar. 28, 2003, entitled A RANDOMIZATION-BASED METHOD TO VERIFY CORRECTNESS OF TRAINING OF A NEURAL NETWORK INCLUDING A METHOD TO CALCULATE CONFIDENCE LEVELS AND FAILURE PROBABILITY AS A FUNCTION OF SAMPLE SIZE, which is incorporated by reference herein in its entirety.

BACKGROUND

1. Technical Field

This application generally relates to neural networks, and more particularly to verification of neural networks.

2. Description of Related Art

Trained neural networks may be verified using a variety of different approaches. One approach is a deterministic approach in which the neural network is verified by exhaustive testing. The neural network is verified at testing points based on the discretization of a search space representing the set of neural network inputs or underlying independent state variables upon which the neural network inputs may be based. The size of the search space or number of test points increases with the dimension of the search space. As the dimensionality increases, neural networks may not be practically verified using this approach with existing computer systems. The currently available deterministic method allows for verification of neural networks but suffers from the curse of dimensionality as just described.

Another approach that may be used in verification of neural networks is a randomized approach. Using this technique, a reduced number of sample points may be used to verify the performance of a neural network within an acceptable error limit. However, even with the randomized approach, the number of sample points required for verification purposes may be impractical as the threshold of acceptable error approaches zero.

Thus, it may be desirable to have an efficient method for verifying a neural network or other component that may be used with a low acceptable error threshold. It may be desirable that this technique also be usable with higher problem space or search space dimensions. It may also be desirable that this technique be independent of the problem space dimension.

SUMMARY OF THE INVENTION

In accordance with one aspect of the invention is a method for verifying correctness of a component comprising: receiving a number of randomly selected samples, M, $$M \geq \frac{1}{\varepsilon} \ln\left(\frac{1}{\delta}\right),$$

wherein $\delta$ represents a confidence value in the range $0<\delta<1$, $\varepsilon$ represents an accuracy level of p-est to its true value p, in the range $0<\varepsilon<1$, p represents a probability that a randomly selected point is in accordance with a selected criterion, F, p-est, an estimate of p based on M randomly selected samples, is zero, and a probability that $(p \geq \varepsilon)$ is equal to or less than $\delta$; determining if each of said randomly selected samples is not in accordance with said selected criterion, F; and verifying correctness of said component based on said determining. The method may also include determining that said component is not verified as correct if any one of said selected samples is in accordance with said selected criterion F; and determining that said component is verified as correct if all of said selected samples are not in accordance with said selected criterion, F. The samples may be points, F may use a function f(x) where x is one of said points corresponding to one or more neural network inputs, f(x) may be a neural network output for a corresponding one of said points, and said criterion F may be that f(x) evaluates to a value that exceeds predetermined bounds. The samples may be points, F may use an error function e(x) represented as: $e(x)=f(x)-\phi(x)$ where x is one of said points corresponding to one or more neural network inputs, f(x) may be a neural network output for a corresponding one of said points, $\phi(x)$ may be an expected output for a corresponding one of said points, and wherein said criterion F may be that e(x) which evaluates to a value that exceeds predetermined bounds. The component may be one of: a neural network, a fuzzy logic model, a fuzzy logic classifier, and a statistical k-neighbor classifier. The component may be included in a system with at least one other component. The component may be a first component, and an output of a second component may be used as an input to the first component, and the method may further comprise: determining whether said first component is verified as correct in accordance with error that may be introduced by said second component's output. The component may be a first component, and correctness of a second component may be verified using said M samples, said second component producing an output which is an input to a third component, and the method may further comprise: determining if each of said randomly selected samples is in accordance with said selected criterion, F for said second component; and determining that said second component is verified as correct unless a predetermined number, b, of said selected samples are in accordance with said selected criterion F, b being equal to or greater than 1. The component may be included in a system of an aircraft being evaluated in accordance with a certification. $\delta$ and $\varepsilon$ may both equal to or less than $10^{-6}$. $\varepsilon$ may be equal to or less than $10^{-9}$.

In accordance with another aspect of the invention is a method for determining a number of randomly selected data values for verification of a component comprising: receiving a value of zero for p-est, an estimate of p based on a random sample, p representing a probability that a randomly selected data value is in accordance with a selected criterion, F; receiving $\delta$ representing a confidence value in the range $0<\delta<1$; receiving $\varepsilon$ representing an accuracy level of p-est to its true value p, in the range $0<\delta<1$, wherein a probability that $(p \geq \varepsilon)$ is equal to or less than $\delta$; and determining said number of randomly selected data values, M, used for verification of a component wherein M is determined in accordance with p-est=0, $\delta$, and $\varepsilon$. The component may be a neural network. The neural network may be a feed forward static neural network. M may be determined according to one of: a Bernoulli analysis based on p-est=0 and a Bayesian analysis based on p-est=0. M may be determined according to said Bernoulli analysis and M may be $$M \geq \frac{1}{\varepsilon}\ln\left(\frac{1}{\delta}\right).$$

may be determined according to said Bayesian analysis with a non-informative prior distribution, and M may be $$M \geq \frac{1}{\varepsilon}\ln\left(\frac{1}{\delta}\right) - 1.$$

M may be determined according to said Bayesian analysis using a family of parameterized prior probability density functions, and M may be $$M \geq \frac{1}{\varepsilon}\ln\left(\frac{1+\delta}{\delta}\right) - 1.$$

In accordance with another aspect of the invention is a computer program product that verifies correctness of a component comprising code that: receives a number of randomly selected samples, M, $$M \geq \frac{1}{\varepsilon}\ln\left(\frac{1}{\delta}\right),$$

wherein $\delta$ represents a confidence value in the range $0<\delta<1$, $\varepsilon$ represents an accuracy level of p-est to its true value p, in the range $0<\delta<1$, p represents a probability that a randomly selected point is in accordance with a selected criterion, F, p-est, an estimate of p based on M randomly selected samples, is zero, and a probability that $(p \geq \varepsilon)$ is equal to or less than $\delta$; determines if each of said randomly selected samples is not in accordance with said selected criterion, F; and verifies correctness of said component based on whether each of said randomly selected samples is not in accordance with said selected criterion F. The computer program product may also include code that: determines that said component is not verified as correct if any one of said selected samples is in accordance with said selected criterion F; and determines that said component is verified as correct if all of said selected samples are not in accordance with said selected criterion, F. The samples may be points, F may use a function f(x) where x is one of said points corresponding to one or more neural network inputs, f(x) may be a neural network output for a corresponding one of said points, and said criterion F may be that f(x) which evaluates to a value that exceeds predetermined bounds. The samples may be points, F may use an error function e(x) represented as: e(x)=f(x)−φ(x) where x is one of said points corresponding to one or more neural network inputs, f(x) may be a neural network output for a corresponding one of said points, φ(x) may be an expected output for a corresponding one of said points, and wherein said criterion F may be that e(x) which evaluates to a value that exceeds predetermined bounds. The component may be one of: a neural network, a fuzzy logic model, a fuzzy logic classifier, and a statistical k-neighbor classifier. The component may be included in a system with at least one other component. The component may be a first component, and an output of a second component may be used as an input to the first component, and the computer program product may further comprise code that: determines whether said first component is verified as correct in accordance with error that may be introduced by said second component's output. The component may be a first component, and correctness of a second component may be verified using said M samples, said second component may be produced an output which is an input to a third component, and the computer program product may further comprise code that: determines if each of said randomly selected samples is in accordance with said selected criterion, F for said second component; and determines that said second component is verified as correct unless a predetermined number, b, of said selected samples are in accordance with said selected criterion F, b being equal to or greater than 1. The component may be included in a system of an aircraft being evaluated in accordance with a certification. $\delta$ and $\varepsilon$ may be both equal to or less than $10^{-6}$. $\varepsilon$ may be equal to or less than $10^{-9}$.

In accordance with another aspect of the invention is a computer program product that determines a number of randomly selected data values for verification of a component comprising code that: receives a value of zero for p-est, an estimate of p based on a random sample, p representing a probability that a randomly selected data value is in accordance with a selected criterion, F; receives $\delta$ representing a confidence value in the range $0<\delta<1$; receives $\varepsilon$ representing an accuracy level of p-est to its true value p, in the range $0<\delta<1$, wherein a probability that $(p \geq \varepsilon)$ is equal to or less than $\delta$; and determines said number of randomly selected data values, M, used for verification of a component wherein M is determined in accordance with p-est=0, $\delta$, and $\varepsilon$. The component may be a neural network. The neural network may be a feed forward static neural network. M may be determined according to one of: a Bernoulli analysis based on p-est=0 and a Bayesian analysis based on p-est=0. M may be determined according to said Bernoulli analysis and M may be $$M \geq \frac{1}{\varepsilon}\ln\left(\frac{1}{\delta}\right).$$

M may be determined according to said Bayesian analysis with a non-informative prior distribution, and M maybe $$M \geq \frac{1}{\varepsilon}\ln\left(\frac{1}{\delta}\right) - 1.$$

M may be determined according to said Bayesian analysis using a family of parameterized prior probability density functions, and M may be $$M \geq \frac{1}{\varepsilon}\ln\left(\frac{1+\delta}{\delta}\right) - 1.$$

BRIEF DESCRIPTION OF THE DRAWING(S)

Features and advantages of the present invention will become more apparent from the following detailed description of exemplary embodiments thereof taken in conjunction with the accompanying drawings in which.

Figure 1:
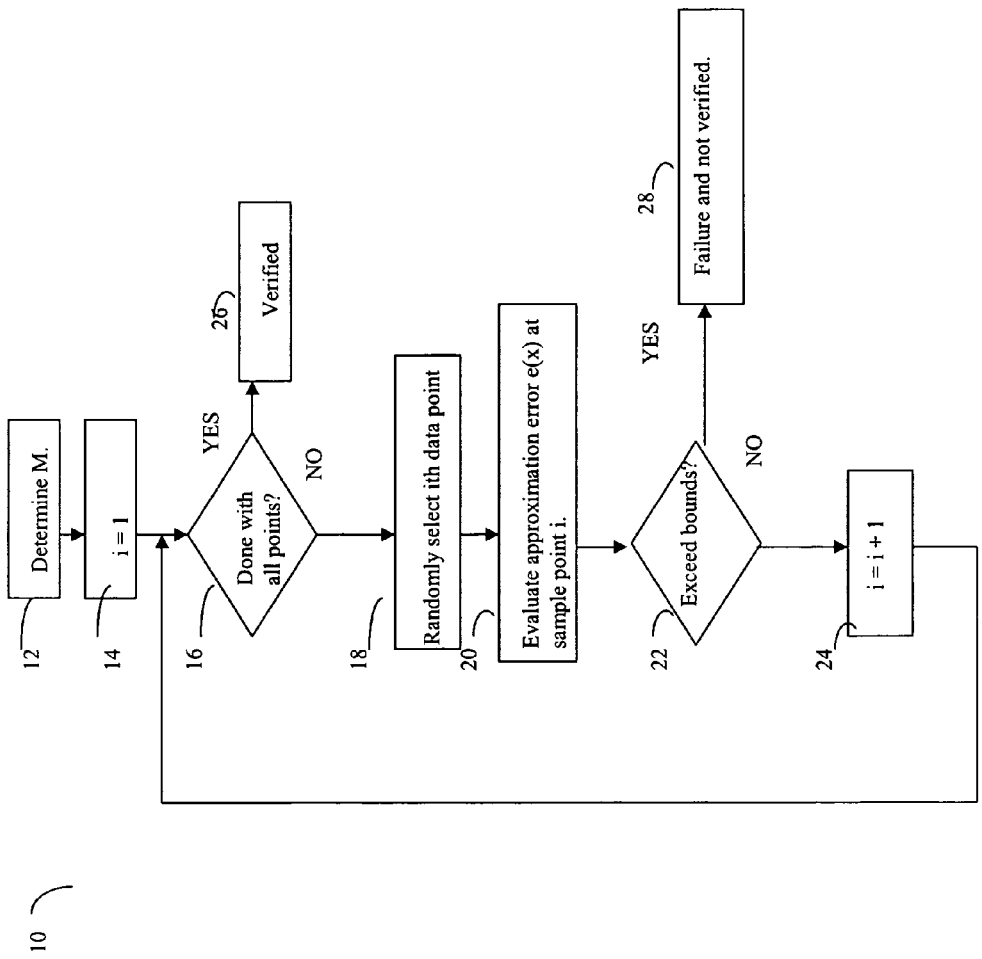
FIG. 1 is a flowchart of processing steps of one embodiment for verifying a component.

DETAILED DESCRIPTION OF
EMBODIMENT(S)

A neural network or other system may have a number of admissible inputs, or underlying independent state variables, which determine the neural network inputs. The neural network may be evaluated at a set of input points corresponding to the neural network inputs and outputs. In connection with a deterministic verification approach, an exhaustive search is performed through a hyper-rectangle representing the set of admissible inputs. Each dimension of the search space is discretized with a uniform step. The performance of the neural network is evaluated at each node of the discretization grid. As the dimension of the search space increases, the number of testing points in the search space also increases exponentially. This may be referred to as the dimensionality problem. Consider the following example in which the search set is a unit hypercube of dimension n. The input space is defined by values along each of its n coordinates. The value range for each of the n coordinates is discretized into the same number of intervals N resulting in the search set being divided into $N^n$ hyper-cubical cells. The total number of test points in the entire grid is $M=(N+1)^n$. For verification using the deterministic approach in this example, the neural net inputs and outputs need to be evaluated at each of these test points. If, for example, a rather coarse discretization of N=20 sub-intervals is applied with a 5-dimensional search space (n=5) for a neural network, verification is performed by evaluating $M=4.08*10^6$ test points. If the search space is instead 10-dimensional, the number of test points increases to $1.67*10^{13}$, and for a 20-dimensional case the number of test points becomes $2.78*10^{26}$. In order to perform verification of the neural network in terms of computational requirements, suppose that evaluation of the neural network and of the reference function takes 100 machine cycles on a 2 GHz machine so that 20 million evaluations are made each second. Verification of the 10-dimensional case for the $1.67*10^{13}$ evaluations would take just under 10 days. However, the $2.78*10^{26}$ evaluations required in the 20-dimensional case would take over four hundred billion years. The numbers increase further if finer discretization, or a larger number for N, is used.

The foregoing deterministic verification approach may be used in verification of neural nets used with many safety-critical applications such as, for example, a fuel measurement system, estimation of aircraft weight, or other functions that may be performed by an aircraft system such as the health, utility and maintenance system used in determining the health of aircraft components. However, as pointed out above, deterministic verification methods may become impractical for verification purposes due to exponential growth of the number of testing points as the dimension of the problem or search space increases. Therefore, use of the deterministic approach is limited to problems with very low-dimensional search space. Consequently, neural nets may not be verified and certified for use in higher-dimensional problems using this deterministic approach.

High-dimensional search spaces appear, for example, in applications of dynamical neural nets. In time delay neural nets (TDNN), dimensionality grows linearly with the number of distinct delays applied to input signals. From the preceding paragraphs, use of the deterministic approach is practically applicable only to TDNN with a very small number of delay lines placed on a few input signals. For verification, for example, of nonlinear FIR filters with multiple delays, alternative techniques other than those based on the deterministic approach may be used.

Described in following paragraphs are some variants of a randomization approach that may be used, for example, in the verification of neural networks, a fuzzy logic model or classifier, K neighbors classifier, and the like. The randomization approach may be used with higher dimensional search spaces since use of the deterministic approach is not feasible for use with such higher dimensional spaces. However, it should be noted that use of the randomization approach, as described herein, is not limited for use with such higher dimensional search spaces and may also be used in connection with lower dimensional search spaces for which the deterministic approach is also feasible.

The randomized approach, also referred to as the Monte Carlo approach, may be used with multi-dimensional integration problems. Consider a one-dimensional function $f(x)$ that may be integrated on the unit interval [0,1]. With no prior knowledge about the nature of the function, one approach to numerical integration is to divide the interval into N sub-intervals of equal length, evaluate the function at the resulting N+1 discretization points $x(i)=i/N$ and then approximate the required interval as:

$$\int_0^1 f(x)dx \approx \frac{1}{N}\sum_{i=0}^{N} f(x(i))$$

Generally, error of such approximation in a one-dimensional case decreases with the number of sampling points N as $N^{-1}$. If the function f(x) is n-dimensional, the integration domain becomes a unit hyper-cube $R=\{x: 0\leq x_j \leq 1\}$. If each coordinate direction is discretized into N sub-intervals, the total number of points at which the function $f$ needs to be evaluated may be represented as $M=(N+1)^d$. Approximation of the integral may be represented as:

$$\int_R f(x)dx \approx \frac{1}{M}\sum_{i_1=0}^{N}\sum_{i_2=0}^{N} K \sum_{i_n=0}^{N} f(x(i_1, i_2, K, i_n))$$

Approximation error of the foregoing also decreases with N as $N^{-1}$, which expressed in terms of M is $$\left(\sqrt[n]{M}\right)^{-1}.$$

To reduce the error by half, N is roughly doubled, which in turn results in increasing the total number of function evaluations $2^n$ times. Use of other integration techniques, such as a Simpson rule of order k, may improve this error rate to $$\left(\sqrt[n]{M}\right)^{-k}.$$

In order to reduce the error by half, M must be increased roughly $$\left(\sqrt[k]{2}\right)^n$$

times. Thus, M also depends exponentially on n. This problem of dimensionality is inherent to any grid-based integration method, and essentially precludes its practicality for larger values of n. This problem of dimensionality is the same problem described above in connection with the deterministic, grid-based approach to neural net verification.

In the Monte Carlo method, instead of uniformly spaced grid points, the function $f$ is evaluated at M points x(i) randomly drawn from the domain R. If the integral is approximated as $$\int_R f(x)\,dx \approx \frac{1}{M}\sum_{i=0}^{N} f(x(i))$$

then, due to Central Limit Theorem, the approximation error converges to zero as $(\sqrt{M})^{-1}$, regardless of dimension n. Thus, quadrupling M in general allows halving approximation error—whether n is equal to 1, 10, or 100. This is a feature of the Monte Carlo method—that the number of sample points necessary to achieve certain accuracy is essentially independent of the dimension n. Thus, high-dimensional problems impossible or not feasible to be solved with the grid-based approach become quite feasible for use with the randomization approach of the Monte Carlo method.

However, the Monte Carlo method may be characterized as being probabilistic in terms of its results. While convergence rate does not depend on n, the result of verification is no longer deterministic. For any particular random sample, the error value may be quite large. What the theory guarantees is that on average the error will be small. By choosing M sufficiently large, probability of the error becoming large may be made arbitrarily small. This is described in more detail in following paragraphs.

A related shortcoming of the Monte Carlo approach is that the number of samples M necessary to achieve certain accuracy may be extremely large. In the past, this limited applicability of the randomized approach to cases when only moderate accuracy is required. However, due the continuous progress in computing hardware, increasingly larger values of M become feasible in practice. It should be noted that the Monte Carlo approach is described in, for example, Fishman, G. S., 1996. *Monte Carlo: concepts, algorithms, and applications*, Springer Verlag, N.Y.

Following paragraphs set forth how this randomized approach may be used in verifying behavior of a neural net.

Randomized verification, as will now be described, may be used to verify input-output properties of a neural net f(x), trained to replace a known function φ(x). Assume the domain of both mappings is restricted to be an n-dimensional rectangle $R=(x^{(lo)}, x^{(up)})$. For any argument x in this domain the value of the reference function φ(x) can be calculated freely, even if this calculation is computationally expensive or the analytical form of φ(x) is not known. Based on the foregoing, there exist multiple formulations of the randomized verification problem.

One approach described herein is to convert the randomized verification problem to standard approximation of an integral. Rather than determine the output or error bounds themselves, the probability that pre-determined limit values are exceeded may be estimated. That is, for the output value-bounding problem, the required bounds $M_{lo}$, $M_{up}$ may be given. The probability p of the event that the actual output of the neural net exceeds these bounds may be estimated and expressed as:

$$p=1-Pr(M_{lo} \leq f(x) \leq M_{up})$$

For the approximation error-bounding problem, the required error bounds $M_{lo}^{error}$, $M_{up}^{error}$ maybe given. The probability $p^{error}$ of the event that the actual approximation error between f(x) and φ(x) exceeds these limit values may be estimated and expressed as:

$$p^{error}=1-Pr(M_{lo}^{error} \leq f(x)-\phi(x) \leq M_{up}^{error})$$

It should be noted that Monte Carlo estimates $\hat{p}$ and $\hat{p}^{error}$ of these probabilities are themselves random variables having their own associated accuracy $\epsilon$ and confidence level $\delta$, so that $$Pr(|\hat{p}-p| \geq \epsilon) \leq \delta \text{ or } Pr(|\hat{p}^{error}-p^{error}| \geq \epsilon) \leq \delta$$

The foregoing is referred to herein as the exceedance probability estimation problem. Note that the foregoing exceedance probability estimation problem sets forth the verification of a system, such as a neural network, in terms similar to those used for prescribed accuracy requirements for verification and certification. Typically, prescribed accuracy requirements are specified for the verified function $f(x)$, and as long as those bounds are satisfied, verification is deemed successful, regardless of whether the true performance is better. Therefore, the exact actual values of the bounds are not the true quantities of interest. Rather, it may be established how likely it is that the error value may exceed the required bounds.

It should be noted that exceedance probability estimation gives results that may be characterized as difficult to interpret. The estimated probability $\hat{p}$ is itself determined in a statistical sense only, which may be a source of additional uncertainty. Converting this uncertainty into probability of f(x) exceeding the prescribed bounds requires that a prior probability distribution be assumed for the unknown quantity p. As described in more detail herein, some probability measure is assumed in order to sample the state domain R—otherwise the estimated probabilities would be meaningless. Although it may be stated that this assumption of a particular probability distribution may be a weakness of the Monte Carlo method, it should be noted that assumptions of a similar kind are necessary for any statistical reliability calculations required for aircraft certification. Therefore, this does not seem to be a limiting factor.

In following paragraphs, the exceedance probability estimation approach to the randomized verification technique is described in more detail. In the exceedance probability estimation approach, the estimated quantity is the probability of the event that the value of the function of interest (the neural net function $f(x)$, or the error function, $e(x)=f(x)-\phi(x)$) does not exceed the predetermined bounds. To simplify description in the following paragraphs, the example case of approximation error bounds (where the function of interest is the error function) is discussed. However, it should be noted that the case of output bounds (where the function of interest is the neural net function f(x)) is similar to that as described herein as the case of output bounds differs only by the function being sampled. A pair of predetermined limit values is represented as $M_{lo}$, $M_{up}$. The purpose is to assess the size of the subset of the domain $R=(x^{(lo)}, x^{(up)})$ on which the function fails to assume values within the bounds:

$$F=\{x \in R: e(x) \leq M_{lo} \text{ or } e(x) \geq M_{up}\} \quad \text{EQUATION 1}$$

It should be noted that it may be desirable to verify that F is an empty set. In practice, however, this cannot be determined with certainty in a Monte Carlo setting. Rather, what is estimated is the measure of F as defined above. If F is found below an appropriately "small" threshold value, then the verification is deemed successful. It should be noted that this threshold value may be, for example, $10^{-9}$ or some other very small positive value close to zero. If this estimation is done according to a probability measure $\mu$ on the domain R, then the measure $\mu(F)$ is the probability, p, as set forth in EQUATION 2 below, that a random point drawn according to this measure belongs to F.

$$p = \mu(F) = \int_F d\mu = \int_R \chi_F(x) d\mu \quad \text{EQUATION 2}$$

In EQUATION 2, $\chi_F(X)$ is the characteristic function of F defined as: equal to 1 if $x \in F$, and 0 otherwise. Monte Carlo estimation of p includes drawing a large number of random, independent samples $x_i$ according to probability measure $\mu$ and then approximating the above integral by a sum represented as:

$$\hat{p} = \frac{1}{M} \sum_{i=1}^{M} \chi_F(x_i) \quad \text{EQUATION 3}$$

In determining the estimation for p in EQUATION 3, the approximation error $e(x_i)$ is evaluated at each sample point to determine if it exceeds the bounds $M_{lo}$, $M_{up}$. In an ideal situation, all test points satisfy the required bounds so that $\chi_F(x_i)=0$ for all i, and the resulting estimate is that $\hat{p}=0$. However, through use of a finite sample size, the fact that the estimate for p is zero does not mean that the actual value of p is zero—since it is possible that the failure set F resides in a small area of domain R that was missed by the sample points although the likelihood of such a situation diminishes as the sample size grows. The question is how many samples should be drawn to say with a high certainty that the possible size of the failure set is "small" enough within a threshold that approximates a near zero value as may be required, for example, in applications such as aircraft certification, or other critical applications with a near-zero failure tolerance. The sample size is described in following paragraphs using different approaches.

In a first approach, what will be described is the sample size according to an estimate using Chernov bounds. The probability of the Monte Carlo experiment giving a misleading result can be estimated by using the Chernov bounds. Chernov bounds are known to those of ordinary skill in the art, for example, in Vidyasagar, M., 1998. Statistical learning theory and randomized algorithms for control, *IEEE Control Systems Magazine*, vol. 18, no. 6, pp. 69-85. Using Chernov bounds, the probability of a misleading result being produced by a Monte Carlo experiment may be represented as:

$$Pr(\hat{p} - p \geq \varepsilon) \leq \exp(-2M\varepsilon^2) \quad \text{EQUATION 4A and 4B}$$

$$Pr(p - \hat{p} \geq \varepsilon) \leq \exp(-2M\varepsilon^2)$$

The foregoing EQUATIONS 4A and 4B give upper bounds on probability that a randomly drawn sample of size M will result in an estimate $\hat{p}$ that differs from the true value p by more than some error threshold, $\varepsilon$. Note that these bounds do not require any knowledge of the true value of p. They are also completely independent from the nature of probability distribution $\mu$. Using the Monte Carlo randomization technique, all sample points are drawn independently according to $\mu$. In the case, for example, for verification purposes such as, for example, with a neural network, the concern is about underestimation of the true value of p—when the estimated value $\hat{p}$ is too small. The opposite case—when true probability of failure p is lower than the estimated quantity $\hat{p}$—may actually be advantageous, and therefore is not described in further detail herein.

In the case described herein, the probability of gross underestimation of p is smaller than a prescribed confidence level $\delta$ and may be represented as:

$$Pr(p-\hat{p} \geq \varepsilon) \leq \delta \quad \text{EQUATION 5A}$$

which follows if $$\exp(-2M\varepsilon^2) \leq \varepsilon \quad \text{EQUATION 5B}$$

which leads to $$M \geq \frac{1}{2\varepsilon^2} \ln\left(\frac{1}{\delta}\right) \quad \text{EQUATION 5C}$$

The accuracy level $\varepsilon$ and the confidence level $\delta$ are determined and set to values. Selection of these values will now be described. Note that the a goal is to ensure that the probability of error function e(x) returning a value outside of prescribed bounds $M_{lo}$, $M_{up}$ is less then some $p_{max}$. It should be noted that neither $\varepsilon$ nor the confidence level $\delta$ is preferably set to $p_{max}$. Consider a first instance in which none of the test points fall into the failure set F, so that $\hat{p}=0$. The Chernov bound states that the true probability is less than $\varepsilon$—with confidence better than $1-\delta$. As known to those of ordinary skill in the art, the confidence level is not a probability itself. Rather, the confidence level represents that, if the true value of p were greater than $\ominus$, then the probability of the Monte Carlo experiment producing estimate $\hat{p}=0$ would be less than $\delta$. The foregoing is preferably translated into the probability of unacceptable error value during neural network's operation. In order to answer this question, it would be necessary to resort, for example, to Bayesian reasoning and assume a prior distribution on the unknown parameter p. Such a model of prior knowledge is often questionable and instead the accuracy parameter $\varepsilon$ and confidence parameter $\delta$ are often specified within the classical non-Bayesian statistical inference framework. A Bayesian aspect of the problem is described elsewhere herein in more detail.

In the table below the critical number of samples M is given for a few combinations of $\varepsilon$ and $\delta$ which correspond to high confidence of estimation

TABLE 1

| | $\delta = 10^{-6}$ | $\delta = 10^{-7}$ | $\delta = 10^{-8}$ | $\delta = 10^{-9}$ | $\delta = 10^{-10}$ |
|---|---|---|---|---|---|
| $\epsilon = 10^{-6}$ | $6.91*10^{12}$ | $8.06*10^{12}$ | $9.21*10^{12}$ | $1.04*10^{13}$ | $1.15*10^{13}$ |
| $\epsilon = 10^{-7}$ | $6.91*10^{14}$ | $8.06*10^{14}$ | $8.06*10^{14}$ | $1.04*10^{15}$ | $1.15*10^{15}$ |
| $\epsilon = 10^{-8}$ | $6.91*10^{16}$ | $8.06*10^{16}$ | $8.06*10^{16}$ | $1.04*10^{17}$ | $1.15*10^{17}$ |
| $\epsilon = 10^{-9}$ | $6.91*10^{18}$ | $8.06*10^{18}$ | $8.06*10^{18}$ | $1.04*10^{19}$ | $1.15*10^{19}$ |
| $\epsilon = 10^{-10}$ | $6.91*10^{20}$ | $8.06*10^{20}$ | $8.06*10^{20}$ | $1.04*10^{21}$ | $1.15*10^{21}$ |

From the foregoing table, it may be observed that the required number of samples depends very strongly (quadratically) on the needed accuracy of estimation $\epsilon$. On the other hand, dependence on required confidence coefficient $\delta$ is weak—to square $\delta$ (e.g. reduce it from $10^{-5}$ to $10^{-10}$) it is just sufficient to double the number of random samples. This is a commonly observed phenomenon in Monte Carlo estimation—high accuracy is very expensive to achieve, while high confidence is comparatively cheap.

The numbers in the TABLE 1, which are based on the Chernov bounds, may be characterized as very high—several orders of magnitude higher than possible to achieve on typical desktop workstations, particularly if a single evaluation of the error function involves time-consuming computations. In terms of a particular application, as a typical requirement for an acceptable failure probability, for example, in civilian aircraft is $10^{-9}$. Accuracy of this order would require around $10^{19}$ random samples drawn based on the value in TABLE 1 above. In one embodiment of a fuel gauging application, for example, a typical number of the test points within the uniform test grid used by the deterministic verification technique may be on the order of $10^6$ to $10^7$ In the randomized setting, using this number of samples would provide for an accuracy of estimation of the order $10^{-3}$—which does not meet the accuracy requirements. The foregoing analysis using Chernov bounds suggests that computational complexity of the randomized verification, while being independent from the problem's dimension and overcoming one of the drawbacks of the deterministic approach, may be still too high for practical applicability and use. In following paragraphs, further description is provided to further improve use of the randomization approach by reducing the required number of samples to achieve a desired accuracy within an acceptable confidence level or threshold.

The foregoing provided estimates of needed sample size using the Chernov bounds. It should be noted that the Chernov bounds provide pessimistic estimates on achievable accuracy based on the worst case scenario. Based on analysis in following paragraphs, more acceptable estimates of sample size are possible if the specific features of the problem in question are further exploited to refine the analysis using a second approach with a Bernoulli analysis. In the case examined herein, one observation is that situations of interest occur when the empirical estimate of the failure probability is very low—that is few, if any, sample points result in larger than allowed error values. To simplify analysis, consider that a number of observed failures is zero, so that $\hat{p}=0$—if any failures are observed, the verification experiment is considered a failure and a new pair of required limits $M_{lo}$, $M_{up}$ may be selected to include the largest so far observed error value. A question that may be posed is: how likely is it that the true failure probability is an unknown positive value $p>0$, but no failures were observed within the finite random sample only due to chance? This is the situation of M independent Bernoulli trials with failure probability $p>0$.

The probability of no failures being observed in M independent trials may be represented as:

$$Pr(\hat{p}=0)=(1-p)^M \qquad \text{EQUATION 6}$$

Given confidence level $\delta$, a confidence interval is a set of values of p such that the above probability is less than $\delta$. In other words, confidence interval is given as an $\epsilon$ such that for all $p<\epsilon$, the following is true:

$$Pr(\hat{p}=0)\leq\delta \qquad \text{EQUATION 7}$$

In the case described herein, instead of finding such an $\epsilon$, a sufficiently large M is desired such that for a given $\epsilon$ the above EQUATION 7 holds. This leads to the condition $$(1-\epsilon)^M \leq \delta \qquad \text{EQUATION 8}$$

By similar reasoning as in described in connection with the Chernov bounds, it follows that if number of samples M satisfies $$M \geq \frac{1}{\varepsilon}\ln\left(\frac{1}{\delta}\right) \geq \frac{\ln(\delta)}{\ln(1-\varepsilon)} \qquad \text{EQUATION 9}$$

then, supposing the true value of p is greater than $\epsilon$, the probability of observing no failures in M trials is below 6. In other words, given zero observed failures, with confidence $\delta$ it may be estimated that p is less than $\epsilon$. Note that to translate the foregoing into the probability of actually observing a failure in any given trial, a prior probability distribution on the unknown parameter p is postulated and Bayes analysis is performed. This is described elsewhere herein in more detail.

Comparing the above bound to the general Chernov bound described previously, it may be observed that quadratic dependence on the term $\epsilon^{-1}$ is replaced by a linear one. This means that to achieve high accuracy of estimation many fewer samples will be needed. In the table below the critical number of samples M is given for a few combinations of $\epsilon$ and $\delta$ that correspond to high confidence of estimation.

TABLE 2

| | $\delta = 10^{-6}$ | $\delta = 10^{-7}$ | $\delta = 10^{-8}$ | $\delta = 10^{-9}$ | $\delta = 10^{-10}$ |
|---|---|---|---|---|---|
| $\epsilon = 10^{-6}$ | $1.38*10^7$ | $1.61*10^7$ | $1.84*10^7$ | $2.07*10^7$ | $2.30*10^7$ |
| $\epsilon = 10^{-7}$ | $1.38*10^8$ | $1.61*10^8$ | $1.84*10^8$ | $2.07*10^8$ | $2.30*10^8$ |
| $\epsilon = 10^{-8}$ | $1.38*10^9$ | $1.61*10^9$ | $1.84*10^9$ | $2.07*10^9$ | $2.30*10^9$ |
| $\epsilon = 10^{-9}$ | $1.38*10^{10}$ | $1.61*10^{10}$ | $1.84*10^{10}$ | $2.07*10^{10}$ | $2.30*10^{10}$ |
| $\epsilon = 10^{-10}$ | $1.38*10^{11}$ | $1.61*10^{11}$ | $1.84*10^{11}$ | $2.07*10^{11}$ | $2.30*10^{11}$ |

The foregoing TABLE 2 illustrates that the required number of samples is dramatically lower than the number of samples illustrated in TABLE 1 as may be obtained using the Chernov bounds. Even though achieving an accuracy of $10^{-9}$ may not be practically achievable in all instances, estimation within accuracy $10^{-6}$ may be characterized as feasible. It should be noted that the required number of testing points set forth above in TABLE 2 are comparable to the required number of testing points used by the inventor in deterministic verification of neural networks for particular applications.

The above derivation may seem to conflict with the accepted knowledge about Monte Carlo methods. It is well known that accuracy of Monte Carlo integration converges like $(\sqrt{M})^{-1}$, or conversely, the required number of samples grows like $\epsilon^{-2}$. Yet, the above derivation, such as set forth in EQUATION 9, suggests that the achievable accuracy converges much faster—like $M^{-1}$, or, equivalently, that the required number of samples grows like $\epsilon^{-1}$.

To explain this seeming contradiction, it is important to observe that the foregoing analysis is valid only if the observed number of failures is zero. In fact, width of the confidence interval increases with the observed number of failures (and with the estimated value of $\hat{p}$) and reaches its maximum for $\hat{p}=\frac{1}{2}$. Observe that the Chernov bound does not depend on the empirical estimate $\hat{p}$ and is valid for any number of observed failures. On the other hand, the cases with even moderately positive values $\hat{p}$ are irrelevant since these cases indicate unacceptably large probability of exceeding the required accuracy bounds. Therefore, for the particular case of interest herein, instances with very small $\hat{p}$ (here—zero) are considered. It is this specialization that allows analytical calculation of much tighter confidence intervals.

It should be noted results similar to that as described in EQUATION 9 may be obtained using other techniques known to those of ordinary skill in the art such as, for example, considering a Gaussian approximation as the distribution of the empirical estimate of $\hat{p}$.

What will now be described is determining a required sample size in accordance with a Bayesian analysis approach. Note that to make precise statements about the actual probability of error exceedance in operation of a verified neural network, a Bayes framework may be used. One problem in applying Bayes theory is the necessity to specify prior probability distributions. The final inference greatly depends on those distributions—in fact, through a suitable choice of priors it is often possible to arbitrarily modify the results. The danger therefore is that an analyst may skew the process when selecting the prior distributions.

On the other hand, when properly used, Bayesian analysis provides conclusions that are much more powerful than the classical ("frequentist") statistical inference. In engineering problems the set of possible values may be quite well known and it may be possible to tell which of its subsets are more likely than others. Bayesian framework provides a perfect opportunity for using such prior knowledge to improve accuracy of statistical inference.

In the present case the prior that needs to be specified is the probability distribution of the unknown parameter p. This distribution will reflect the belief about likelihood of particular values being the true value of p. Since p is a probability itself, it is known that $p \in [0,1]$. A first analysis will now be described when no other knowledge about p is available. In other words, consider a so-called non-informative prior distribution according to a density function $$f_p(x) = 1 \forall p \in [0,1] \quad \text{EQUATION 10}$$

This is a standard choice for a prior distribution with no concrete knowledge available—all possible values of p are equally likely. This is described, for example in Berger, J. O., 1985. *Statistical decision theory and Bayesian analysis*, Springer Verlag, N.Y.

Note that in the case herein, this choice reflects high level of distrust towards the neural net training process by stating, for example, that a net that exceeded the specified error bounds in 95% of random samples is as likely as a net does it in only 5% of cases. In connection with actual results, it is hoped that the low values of p are much more likely—in fact this very argument was often used in the preceding section. In effect this choice of prior is a very conservative one. For sake of simplicity, this case of assuming an estimate of $\hat{p}=0$ is considered first.

As in the preceding paragraphs, the observed number of error values exceeding the prescribed limits is zero—hence $\hat{p}=0$. The probability of such an occurrence given a true value of p is $$Pr(\hat{p}=0|p) = (1-p)^M \quad \text{EQUATION 11}$$

Total probability of this event is then given by $$Pr(\hat{p}=0) = \int_0^1 Pr(\hat{p}=0|p) f_p(p) dp = \int_0^1 (1-p)^M dp = \frac{1}{M+1} \quad \text{EQUATION 12}$$

The prior probability of the observed outcome is the same as of any other outcome—all numbers of observed failures are initially equally likely. Now, using the Bayes formula the posterior probability density for p given that $\hat{p}=0$ may be determined as:

$$f_p(p|\hat{p}=0) = \frac{Pr(\hat{p}=0|p) f_p(p)}{Pr(\hat{p}=0)} = (M+1)(1-p)^M \quad \text{EQUATION 13}$$

It may be verified that this is a proper density function. With this posterior density calculated, a quantity that was impossible to determine in the non-Bayesian setting may be estimated. This quantity is the conditional expected value of the unknown parameter $$E(p|\hat{p}=0) = \int_0^1 p f_p(p|\hat{p}=0) dp = \frac{1}{M+2} \quad \text{EQUATION 14}$$

The foregoing quantity represents a least-squares estimate of p given the observed empirical value $\hat{p}=0$. It also represents the overall posterior probability of the neural net's failure—that is of the approximation error exceeding the required bounds—given that no failures were observed in M random trials. The fact that this value is larger than the empirical value $\hat{p}$ reflects our assumed prior knowledge about possible values of p, which is heavily biased towards larger values. A conservative choice of prior density function for p results in certain level of distrust towards the empirical value $\hat{p}$—even though no failures at all were observed, the best estimate for probability of failure is still positive.

The posterior probability that the true value of p is larger than some $\epsilon$ may be represented as:

$$Pr(p > \varepsilon | \hat{p}=0) = \int_\varepsilon^1 f_p(p|\hat{p}=0) dp = (1-\varepsilon)^{M+1} \quad \text{EQUATION 15}$$

For this probability to be less than a prescribed value $\delta$, the following is used:

$$(1-\varepsilon)^{M+1} \leq \delta \quad \text{EQUATION 16}$$

$$M+1 \geq \frac{\ln(\delta)}{\ln(1-\varepsilon)} \quad \text{EQUATION 17}$$

Based on reasoning described elsewhere herein, the following condition for the required number of samples may be obtained:

$$M \geq \frac{1}{\varepsilon}\ln\left(\frac{1}{\delta}\right) - 1 \qquad \text{EQUATION 18}$$

Note that this approximates an M which is very similar to that as obtained using other approaches as described herein. The Bayesian analysis with the non-informative prior distribution may be characterized as equivalent to the classical non-Bayesian analysis, if the confidence factor δ is interpreted as posterior probability of estimation error p−p̂ being greater than ε (which in our case translates into p≧ε). A number of samples used to achieve a given confidence factor δ and a given confidence interval [0, ε] is described elsewhere herein.

Applicability of Bayesian analysis depends on the prior distribution being a sensible and accurate representation of the available knowledge about the actual system and the neural net being verified. If the neural net training process was conducted according to the standard practice as known to those of ordinary skill in the art, it is quite likely that the obtained approximation error will be low. Therefore, if the required error levels $M_{lo}$, $M_{up}$ are reasonable, it is not expected that the failure set F be too large—in other words, it is expected that the estimated parameter p be fairly small. Based on this, if 0<α<1, then the probability of p being larger than α is zero. Accordingly, consider a family of prior probability density functions parametrized by α:

$$f_P(p) = \begin{cases} \frac{1}{\alpha} & \text{for } 0 \leq p \leq \alpha \\ 0 & \text{for } \alpha < p \leq 1 \end{cases} \qquad \text{EQUATION 19}$$

Small values of α represent greater initial confidence in results of neural net training—high probability density is assigned to a small interval [0,α].

What will now be described is how the required number of samples M and the conditional expected value of p depend on the choice of α.

What will be considered is the case when the number of observed failures (neural net approximation error exceeding the error limits $M_{lo}$, $M_{up}$) is zero. Total probability of such an event is then given by $$\Pr(\hat{p} = 0) = \int_0^1 \Pr(\hat{p} = 0 \mid p) f_P(p) \, dp \qquad \text{EQUATION 20}$$

$$= \int_0^\alpha (1-p)^M \frac{1}{\alpha} \, dp$$

$$= \frac{1 - (1-\alpha)^{M+1}}{\alpha(M+1)}$$

This probability is larger than in the previous non-informative case and grows as α approaches zero. If α is positive and M is suitably large (as it will be in practice) the term $(1-\alpha)^{M+1}$ may be omitted $$\Pr(\hat{p} = 0) \approx \frac{1}{\alpha(M+1)} \qquad \text{EQUATION 21}$$

Thus, prior probability of zero failures is now 1/α times greater than in non-informative case—which is caused by support interval of prior distribution $f_p(x)$ being 1/α times shorter. Now, using the Bayes formula the posterior probability density for p given p̂=0 may be represented as:

$$f_P(p \mid \hat{p} = 0) = \frac{\Pr(\hat{p} = 0 \mid p) f_P(p)}{\Pr(\hat{p} = 0)} \qquad \text{EQUATION 22}$$

$$= \begin{cases} \frac{(M+1)(1-p)^M}{1 - (1-\alpha)^{M+1}} & \text{for } 0 \leq p \leq \alpha \\ 0 & \text{for } \alpha \leq p \leq 1 \end{cases}$$

It may be verified that this is a proper density function. With this posterior density calculated, the conditional expected value of the unknown parameter may be represented as:

$$E(p \mid \hat{p} = 0) = \int_0^1 p f_P(p \mid \hat{p} = 0) \, dp \qquad \text{EQUATION 23}$$

$$= \int_0^\alpha p \frac{(M+1)(1-p)^M}{1 - (1-\alpha)^{M+1}} \, dp$$

$$= \frac{1}{M+2} - \frac{M+1}{M+2} \frac{\alpha(1-\alpha)^{M+1}}{1 - (1-\alpha)^{M+1}}$$

When α approaches 1, this approaches the non-informative case $$E(p \mid \hat{p} = 0) \underset{\alpha \to 1}{\to} \frac{1}{M+2} \qquad \text{EQUATION 24}$$

When α approaches 0, however, this estimates tends to zero, too $$E(p \mid \hat{p} = 0) \underset{\alpha \to 0}{\to} \frac{\alpha}{2} \qquad \text{EQUATION 25}$$

The expected conditional value of p has interpretation as the posterior probability that a single failure (exceedance of error bounds) will occur in a single evaluation of a neural net after deployment in the field. It may be observed that for any α<1, this is smaller than the value obtained in the non-informative case α=1. The non-informative prior is the most conservative choice. Based on the foregoing discussed family of priors, the posterior probability of a single failure, given zero failures observed in M random samples, is always lower than 1/(M+2).

The confidence interval for a given confidence level δ may be determined. In other words, an ε is desired such that.

$$\Pr(p > \varepsilon \mid \hat{p} = 0) = \int_\varepsilon^1 f_P(p \mid \hat{p} = 0) \, dp < \delta \qquad \text{EQUATION 26}$$

If $\epsilon<\alpha$, the probability above is calculated as $$\Pr(p>\varepsilon|\hat{p}=0)=\int_{\varepsilon}^{\alpha}\frac{(M+1)(1-p)^{M}}{1-(1-\alpha)^{M+1}}dp \quad \text{EQUATION 27}$$
$$=\frac{(1-\varepsilon)^{M+1}-(1-\alpha)^{M+1}}{1-(1-\alpha)^{M+1}}$$

The condition for $[0, \epsilon]$ to be the confidence interval becomes $$\frac{(1-\varepsilon)^{M+1}-(1-\alpha)^{M+1}}{1-(1-\alpha)^{M+1}}<\delta \quad \text{EQUATION 28}$$

Note that $\epsilon<\alpha$ and therefore $(1-\epsilon)^{M+1}>(1-\alpha)^{M+1}$ and $1-(1-\epsilon)^{M+1}<1-(1-\alpha)^{M+1}$ leading to the following sufficient condition for the confidence interval $$\Pr(p>\varepsilon|\hat{p}=0)=\frac{(1-\varepsilon)^{M+1}-(1-\alpha)^{M+1}}{1-(1-\alpha)^{M+1}} \quad \text{EQUATION 29}$$
$$<\frac{(1-\varepsilon)^{M+1}}{1-(1-\alpha)^{M+1}}$$
$$<\frac{(1-\varepsilon)^{M+1}}{1-(1-\varepsilon)^{M+1}}$$
$$<\delta$$

As a result, $\delta$, $\epsilon$ and M maybe:

$$\frac{(1-\varepsilon)^{M+1}}{1-(1-\varepsilon)^{M+1}}<\delta \quad \text{EQUATION 30}$$

$$(1-\varepsilon)^{M+1}<\frac{\delta}{1+\delta} \quad \text{EQUATION 31}$$

Thus, the inequality for M becomes $$M+1\geq\frac{\ln\left(\frac{\delta}{1+\delta}\right)}{\ln(1-\varepsilon)} \quad \text{EQUATION 32}$$

and may be approximated as:

$$M\geq\frac{1}{\varepsilon}\ln\left(\frac{1+\delta}{\delta}\right)-1 \quad \text{EQUATION 33}$$

For small values of the confidence factor $\delta$ as considered here, the foregoing condition approximates those obtained for the non-informative case. Note that the above is a rough approximation which becomes tight only as $\alpha$ approaches zero. For sensible, positive values of $\alpha$, a smaller number of samples will satisfy the condition $$Pr(p-\hat{p}>\epsilon|\hat{p}=0)<\delta \quad \text{EQUATION 34}$$

This confirms the initial conjecture that, for this family of prior densities $f_p(p)$, the non-informative choice may be characterized as the most conservative requiring the largest number of samples to obtain a given accuracy level $\epsilon$ and confidence level $\delta$. This demonstrates certain robustness of the method and validates prior conclusions regarding the required computational effort required by the randomized verification approach.

Described herein is an approach to randomized verification of a system, such as a neural net using the exceedance probability estimation. In this method, one is given predetermined required limits on neural network output and error and the goal is to estimate (bound from above) the probability that these limits might be exceeded. One advantage of this method is that the required number of random samples is completely independent from dimension of the underlying search space. This is in stark contrast with the deterministic technique. The randomized method is suitable for tackling problems that may be characterized as not practical for use with the deterministic method. For example, the same number of samples will be required for verification of a neural net having a 2-dimensional and a 200-dimensional problem domain. Of course, as will be appreciated by those of ordinary skill in the art, this does not mean that the execution time (or the number of CPU cycles) will be the same in both cases. As dimension of the state space increases, so will the computational complexity of evaluating values of the neural net output f(x) and of the reference function $\phi(x)$ for each sample point x. The rate of increase depends on the particular application in which the neural net is used. Nevertheless, the additional computational effort required for higher dimensions may be characterized as modest in comparison to the exponential growth observed in the deterministic method.

Independence of the number of samples M from dimensionality n is somewhat marred by the fact that the required M is quite large. In a general Monte Carlo setting, to estimate exceedance probability with accuracy E and confidence $\delta$ it is necessary to draw at least $$M=\frac{1}{2\varepsilon^2}\ln\left(\frac{1}{\delta}\right)$$

samples. If very high confidence and accuracy of $10^{-9}$ is required, then the necessary M becomes impractical for use such as, for example, on the order of $10^{19}$ samples. This number may be far too large for currently available computers. For example if evaluation of both f(x) and $\phi(x)$ for a single argument took just 1 μs (a rather optimistic time for a typical application) then $10^{19}$ evaluations would require $10^{13}$ seconds—or 317098 years on a single processor. Thus, even utilizing a parallel computer with 64k processors, about 5 years of computation time may be needed to verify a single neural net.

However, as described herein, a significant reduction of the above condition on M occurs for the case when the estimated exceedance probability is close to zero. This special case is relevant, for example, to the neural net verification problem—if many exeedances are observed and the estimated probability is high, then the net under test will fail anyway. In other words, if the probability is 0.49 or 0.4999, both of these cause the net to not be verified as correct. However, in the instance where the probability is much closer to zero such as, for example, $10^{-9}$ or $10^{-8}$, when no exeedances are observed among the random test points, the required number of test cases becomes $$M = \frac{1}{\varepsilon}\ln\left(\frac{1}{\delta}\right).$$

In the example considered above, around $2*10^{10}$ random samples would be needed, which would translate into just 20000 seconds or less than 6 hours on a single processor, which is a quite feasible computation time to verify a neural net. Thus, using the techniques described herein, the accurate Monte Carlo-based verification of neural nets may be feasible in many applications.

Note that in practice, a single evaluation of f(x) and φ(x) may take much longer than 1 μs. In such instances, it may be desirable to utilize several processors executing in parallel to minimize or reduce computation time. Note that when utilizing parallel processing in an embodiment, it is preferred that the generation of random samples $x_i$ on different processors be independent. This may be assured by making one processor a single generator of sequence $x_i$, with values $f(x_i)$ and $\phi(x_i)$ evaluated by the remaining processors.

When utilizing the randomization approach—the Monte Carlo method—it may no longer be stated with absolute certainty that the neural net output or its approximation error will never exceed the calculated bounds. Rather, it may be stated that with a high (but less than 1) confidence, 1−δ, that the probability of exceeding these bounds is less then ε. Using the Bayesian approach, it may also be stated, subject to correctness of the assumed prior distributions, how large this probability of failure actually is. In either case there is a non-zero possibility that the calculated output or error bounds might occasionally be exceeded due to the statistical nature of this approach.

It may be noted that the statistical nature of the Monte Carlo approach might preclude its applicability to the neural net verification problem. In software verification, for example, deterministic verification has been traditionally accepted. However, as described herein, the statistical approach may also be utilized for verification of neural networks and other components, systems, and the like. Error or failure encountered with the neural network may be attributable to the algorithm or modeling error rather than an error introduced by use of the neural network itself. Correctness of a design, model, or algorithm that may be implemented using a neural network may often be verified by some approximation, simulation, or modeling technique. Similarly, probabilistic analysis of a neural network may be accepted also as a basis for verification. Another argument in favor of randomized verification is based on observation that the model against which the net is verified is itself an approximation of the physical system. The error between the system and its model is rarely known with certainty and is often expressed in probabilistic sense. Thus, even if the neural network is deterministically verified against such a model, there may remain a statistical uncertainty regarding validity of such result. An additional uncertainty resulting from the randomized verification procedure may be quite acceptable if it is small compared to the modeling error.

The randomized approach may be characterized as a feasible technique for use with verification of neural nets and may be of particular applicability with higher-dimensional problem spaces as described herein.

It should be noted that the Monte Carlo estimation in the non-Bayesian setting uses two measures of uncertainty—the accuracy of estimation ε and its confidence δ. The latter quantity cannot be strictly interpreted as probability that the estimated parameter lies outside the interval $[\hat{p}-\varepsilon, \hat{p}+\varepsilon]$. Rather, it may be interpreted as an upper bound on the probability of drawing an empirical estimate equal to or less than the actually observed value $\hat{p}$ if the true parameter p was greater than $\hat{p}+\varepsilon$, and as an upper bound on the probability of drawing an empirical estimate equal to or greater than the actually observed value $\hat{p}$ if the true parameter p was less than $\hat{p}-\varepsilon$. In the special case described herein with $\hat{p}=0$ and p>0, the confidence parameter δ may be interpreted as the probability (or an upper bound on the probability) of obtaining the empirical value $\hat{p}=0$ if the true value p was greater than ε. The values selected for these parameters may vary in accordance with each embodiment and application.

In one embodiment described herein, values for both ε and δ may be selected on the same order as the required reliability of the avionics system. Thus, an embodiment may select values for both of these parameters that are, for example, less than $10^{-9}$ or $10^{-10}$, which are the typical reliability requirements for safety critical systems. This is a simplistic choice. It should be noted that additional factors of a particular embodiment that may vary with each embodiment may also be considered.

When examining failure of a neural network and determining an acceptable error threshold, possible error introduced by other components should be considered. For example, reliability requirements may be specified at a system level or in other terms rather than at a component level as applied to the neural network. Reliability requirements may be specified in terms of probability of a single failure within an hour of flight. A neural network-based algorithm may be executed many times during a single flight hour. As an example, a system may use a sampling rate of 10 Hz, or 36000 executions per hour. Conversion of a typical reliability requirement of $10^{-9}$ per flight hour for the neural net results in the required probability of failure being $2.78*10^{-13}$ per single execution of the neural net. However, the neural network module, hardware and/or software, operates with other components in the system. In an avionics system, the inputs and outputs of the neural network may undergo multiple stages of processing that may also introduce error not attributable to the neural network. These other components may include, for example, low-pass filtering, rate limiting and other techniques that reduce effects of generalized "noise". The output of these components introducing error may be used as inputs to the neural network. Additionally, from the point of view of other aircraft subsystems, a single instance of failure of the neural net routine may constitute such noise that may be filtered out before being processed by another component. Thus, in the event of a single failure of a neural network output, there may be no discernible effect whatsoever on the rest of the system as with error that may be introduced by other components whose output may be similarly processed.

Note that for a neural net malfunction to propagate to other software and/or hardware components, or to manifest itself in a physical signal transmitted to hardware, several consecutive neural net outputs have to be outside of the required performance limits—an event of a much lower probability than a single failure. If inputs to the neural net are completely independent, then probability of n consecutive failures would be equal to $p^n$. For example, if three consecutive neural net failures are required to cause a system failure, then, in the above example with the 10 Hz rate of execution of a neural net, it would be enough for the probability of a single failure to be less than $6.52*10^{-5}$ in order to guarantee the required reliability of $10^{-9}$ failures per flight hour. However, neural net inputs in consecutive moments may not be characterized as independent. If at moment k the input vector entered the failure set F, then it is at least somewhat likely it will remain within the set F, or close to it, at moment k+1. To appropriately convert the system reliability requirements into the neural net failure probability, an embodiment may model statistical dependence of the neural net's inputs and assume specific forms of input and output filtering. It may also be advantageous to adjust the required failure probabilities according to the magnitude of error exceedance. Large exceedances are much less desirable and may lead to system failures more quickly. Specifications of those different required probabilities are dependent on the particular system.

An embodiment may also convert the required neural net failure probability into corresponding values for parameters $\epsilon$ and its confidence $\delta$. As described herein, an embodiment may use Bayesian techniques in determining such values based on a particular desired failure rate. However, validity of Bayesian analysis may be questioned. Alternatively, instead of specifying the total probability of a failure event, the performance requirements may be specified in an embodiment in terms of confidence interval $\epsilon$ and confidence level $\delta$. These quantities are commonly used wherever classical statistical tests are applied—for example in design and analysis of automated detection and diagnosis system. It should therefore be possible to develop consistent methodology of specifying values $\epsilon$ and $\delta$ based on original reliability requirements, which would be acceptable to certification authorities. This may involve interpreting relevant regulations and establishing new verification procedures in accordance with appropriate regulatory boards or organizations.

It should be noted that objections may be made to use of a Bayesian approach to statistical inference as described herein because of its dependence on the assumed prior distributions. Choice of a particular prior distribution may heavily influence the final result. It should be remarked, however, that such a choice is nothing more than postulating a probabilistic model of the analyzed system. Engineering analyses may be based on a model of some kind. Thus, it should be noted that use of a statistical based approach may also be used in verifying an implementation of a model as well in the same way the model itself may be verified prior to performing any implementation.

Proponents of Bayesian approach may note that in almost all cases of statistical inference, something is known about likely and unlikely ranges of estimated parameters. If such knowledge is available, then it may be absurd not to use it. For example, if from previous preliminary analyses, it is known that the estimated parameter p cannot possibly be greater than ½, then it would not make sense to assume otherwise. Inclusion of such knowledge may be advisable and taken into consideration, for example, by specifying a prior probability distribution.

One advantage of the Bayesian method is that it allows replacing the vagueness of confidence intervals and confidence levels with probabilities and expected values. A randomized Bayesian verification experiment results directly in a value of the posterior probability of the neural net failing (performing out of requirement bounds)—the kind of a result that is not possible to achieve in the non-Bayesian approach. This makes it much easier to convert the per-flight-hour reliability criteria into requirements for the accuracy of estimation of p.

One disadvantage of the Bayesian method is that an inappropriate choice of the prior distribution may skew the final inference and lead to erroneous conclusions. For example, if it is assumed that the prior probability density of p is zero on a certain subinterval of [0,1], such as [$\alpha$, 1] then it may be that no amount of empirical evidence to the contrary may cause the final estimate to reside in that sub-interval. Thus, it is important that non-zero prior density is assumed on all feasible sub-intervals.

If no knowledge is available about likely values of p, then a non-informative prior may also be used, as also described herein. Use of the non-informative approach assigns equal probability to all values of p between 0 and 1.

It should be noted that another objection to Bayesian estimation may be that the estimated quantities are treated as random variables, while in fact they may be perfectly deterministic. A response may be that a probabilistic model is only one way to model a lack of definite knowledge. If a quantity is modeled as a random variable, it doesn't necessarily mean that quantity is truly random. Rather, it means that there may not be sufficient knowledge about the variable to make any accurate pronouncements about values, or relationships of the variable with respect to other known quantities. Thus, randomness may be characterized not as an intrinsic property of a phenomenon, but, in contrast, as an artificial construct. Assigning a probability distribution to an unknown parameter may signify beliefs about relative likelihood of this parameter (which itself may be completely deterministic) assuming a value in different regions. Moreover, in some embodiment, such as with the final behavior of a neural net, that output may be correctly characterized as random. If the nets are trained using randomly generated training data with randomly drawn initial conditions for connection weights, then the resulting trained net may be treated as a randomly drawn specimen from a family of possible neural nets. Accordingly, the estimated parameters may be treated as a random variable. It may be appropriate, then, to use prior knowledge about distribution of this parameter to improve inference about its particular value for the neural net at hand.

It should be noted that the sensitivity of the randomized verification results with respect to the choice of the prior distribution of the estimated parameters may be considered. In particular, it may be of interest to analyze the worst-case scenarios leading to widest confidence intervals or, equivalently, worst-case confidence factors. If worst-case bounds on size of the confidence interval for selected families of prior distributions are determined, those worst-case bounds may be used to determine the necessary size of the random sample to provide for a more robust use of the techniques described herein with respect to the particular choice of a prior distribution. It should be noted that particular prior distributions that may be used are described herein. An embodiment may use other prior distributions than as described herein, for example, density functions that are piece-wise constant on a finite (larger than two) number of sub-intervals. Families or prior distributions may be selected that are sufficiently general to cover a wide range of possibilities, but simple enough to allow easy calculations of the necessary quantities.

As described herein, randomized verification may be utilized in connection with certification of components and/or systems. This certification process may be regulated by authorities that must approve of and otherwise accept the randomized verification technique for use in this process. It may be a problem in obtaining acceptance of the randomized verification technique. One issue may be acceptance of its non-deterministic nature by regulatory bodies. Deterministic verification has been a long-standing principle in the domain of software verification. Changing this mindset and allowing randomized approach may be difficult.

Arguments or points for acceptability of the randomized verification are described herein. As described herein, verification of algorithm or model and its implementation may be separated. Many applications use techniques, such as estimation or simulation techniques, in verifying a model. Use of the randomized verification approach is a similar way of verifying correctness of a particular model's implementation or embodiment. For example, use of Monte Carlo type testing for complex numerical algorithms is not uncommon in aerospace applications. Complexity of mathematical models of aircraft often precludes use of analytical verification. Suppose that an optimal control policy is calculated and stored in form of a look-up table. Then, actual optimality of the computed solutions may be very difficult to verify with absolute certainty, as numerical optimization methods are iterative in nature, involve complicated stopping criteria, and are guaranteed to always work only under very restrictive and often impossible to verify assumptions. In practice, acceptability of the computed optimal control algorithm may be verified only through extensive Monte Carlo simulations using an aircraft model. A similar approach may be advocated for verification of neural nets. Because it is already well accepted in case of many other algorithms, it should be possible to obtain such acceptance in case of neural nets, too.

Another perspective may be obtained by viewing a neural net's algorithm as a source of signal within a system. In a measurement application, such as a fuel gauging problem, the neural net can be seen as a virtual sensor. In a control system application such as for flight control, a neural net may be characterized as a replacement for an analog electronics board that transforms measurement or command signals into a control signal. In either case, verification of validity of the algorithm itself could be viewed as equivalent to verification of a hardware component, such as a sensor or an analogue electronics board. Accordingly, occasional incorrect (out of performance bounds) output of the neural net algorithm may be viewed as equivalent to an instance of random measurement noise. Statistical analysis of reliability of hardware components is quite common, so techniques used there could be adopted in our neural net verification problem.

Yet another perspective on randomized verification may be provided by considering the approximate nature of the system model against which the net is verified. Recall that the reference (desired) output for the neural net may provided by a simulation model of an aircraft subsystem. The model is an approximation of the actual physical system and may introduce a degree of error or uncertainty. The approximation error between the system and the model may rarely be assessed with certainty and may be expressed in probabilistic terms. Therefore, even if an algorithm is deterministically verified against a system model, its actual performance within the physical system may be predicted in statistical terms. In view of this, one may question the requirement or accepted approach of deterministic verification. Since there is already a statistical uncertainty about the algorithms performance, introduction of additional $10^{-9}$ probability of failure through the use of randomized verification represents a quantitative rather than a qualitative change.

The foregoing are several points that may be raised in favor of randomized verification approach. It should be noted that different verification processes may be used in connection with algorithm design and a particular hardware and/or software implementation.

Use of the randomized verification technique described herein is based on using test points that are randomly selected. It should be noted that, in practice in an embodiment using a computer processor, a pseudo-random number generator may be used. These are fully deterministic sequences resulting from complicated difference equations that give impression of being random. This notion of pseudorandom number generators approximating a random number stream may be quantified by precise statistical tests for randomness and lack of dependence. Good pseudorandom number generators are distinguished from inadequate ones by the kinds of tests they pass. Thus, selection of a particular generator may require use of generators having random sequences whose length is on the order of $10^9$ or higher (for each testing point its n coordinates need to be generated) in accordance with the number of random test points needed for the particular desired error level or failure rate.

As described herein, test points may be drawn from the hyper-rectangular search space according to the uniform distribution. This is equivalent to stating that there is no prior knowledge about relative likelihood of the state of the system visiting different regions of the search space. In embodiments, such knowledge may be available. For example, in connection with aircraft, certain operating regimes may occur much more seldom than others do. Particularly in the Bayesian setting, this knowledge may and should be incorporated into the randomized verification procedure. This may be done by using an appropriate sampling distribution that reflects the probability of the system visiting different regions of the search space during actual operation. Using the techniques described herein, all analyses presented remain valid—the estimated quantity p is still the measure of the failure set F, except that according to the assumed non-uniform probability measure. In order to determine an appropriate prior distribution, a sampling distribution may be constructed that closely models actual frequencies of different regions of the search space during the system's operation.

The techniques described herein may be used in a neural network and has been based on no connections between the neural network input values in consecutive time instances. Even if the neural network is a pre-trained, static, feedforward net, its inputs may result from measurement of dynamical signals. For the estimated probabilities to truly represent behavior of the actual system, this dynamical aspect should be taken into account. For example, if the neural network's input entered the failure set F at the time instant k, the chances of the input remaining in this failure state or set at a time instant k+1 may be considerably larger if these time instances are not treated as independent of one another.

In applications when a neural net is a component of a feedback loop within a control system, dynamic modeling can no longer be avoided. If the net's inputs are influenced by its previous outputs, then the uniform approximation of the distribution of input values may be too simplistic. Also, hyper-rectangular approximation of the admissible input set may be inadequate. Analytical modeling of this input sets might be practically impossible. Fortunately, its shape and the probability distribution may be modeled by Monte Carlo simulation. If probability distributions for transitions between the input vectors may be specified, rather than for input vectors themselves, simulating the obtained stochastic dynamical system may be used to ensure correctness of the resulting distribution of the neural networks input vectors. The field of Monte Carlo Markov Chain methods is concerned with such a case—deducing instantaneous distributions of quantities that are samples of signals governed by stochastic difference equations. In some cases, it may be possible to replace a large number of independently generated samples by a sequence of samples generated from a single (even if very long) simulation of the system with the neural net placed within a feedback loop.

The randomized approach may also be used in connection with verification of recurrent nets. Under the deterministic paradigm, recurrent nets are practically impossible to verify, as their output values, through recurrent connections, depend on infinite sequences of past input values, which makes the resulting search space infinite dimensional. In practice, if a net is stable, its memory will recede—i.e. its dependence on past inputs gets weaker as time lag increases. The number of past output values affecting the current output may be considered finite giving rise to a finite-dimension problem. Even in this instance, though, the dimensionality of the search space may exceed practical limits for application of a deterministic, grid-based verification method. However, use of the randomized method's required number of samples does not depend on the dimension of the search space. One complexity to the foregoing is that each of the samples becomes a sequence (and possibly a long one) of values resulting from a simulation through time of the recurrent network. Thus, a large amount of computation may be needed per test point causing an overall large computational load that may not be feasible.

It should also be noted that one limitation of the deterministic verification technique is that for each input vector, a desired output value must be provided against which the actual net's output is compared. Such reference value may be difficult to calculate. For example, in control applications the very reason to apply a neural net solution may be that the desired value is unknown as a function of inputs. An advantage of the randomized verification approach is that the desired output is not needed for each time instant. It is only necessary to classify each testing point (in this case a simulation run) as either successful or not. Thus, various verification criteria may be utilized in addition to the previously considered exceedance of predetermined error bounds. In this sense, the randomized verification method is applicable to a much wider spectrum of practical problems than the previously developed deterministic approach.

What will now be described are figures summarizing the techniques and some example uses as set forth above.

Referring now to FIG. 1, shown is a flowchart 10 of processing steps that may be performed in an embodiment in connection with verification of a component. In this example, the component is a neural network and the processing steps of 10 may be performed in connection with verification of the output of the neural network or a related error condition. As will be appreciated by those of ordinary skill in the art, the processing steps of flowchart 10 may also be applied and used in connection with verification of other components. The flowchart 10 summarizes processing steps described above in connection with the exceedence of predetermined bounds using the error function e(x). It should be noted that other functions of interest, such as f(x), or others may be selected in accordance with the particular component being verified and particular application.

At step 12, M is determined in accordance with the selection of $\delta$ and $\epsilon$. It should be noted that, as described herein, M may be derived using a variety of different approaches all arriving at approximately the same equation with the assumption that the estimate of p, $\hat{p}$, is zero. At step 14, the counter, i, of the number of data points is initialized to 1. At step 16, a determination is made as to whether all M data points have been processed. If so, control proceeds to step 26 where it is determined that the neural network is verified as being correct since no data point caused the condition at step 20 to exceed predetermined bounds. If step 16 determines that not all M points have been processed, control proceeds to step 18 where the next ith data point is randomly selected. At step 20, the ith data point is evaluated in accordance with the particular function which, in this example, is the error function e(x). At step 22, a determination is made as to whether the error e(x) exceeds the predetermined bounds. If so, control proceeds to step 28 where a conclusion is made that the verification has failed and the neural network is not verified as correct. Otherwise, control proceeds to step 24 where i is incremented and processing proceeds with the next data point.

Figure 2:
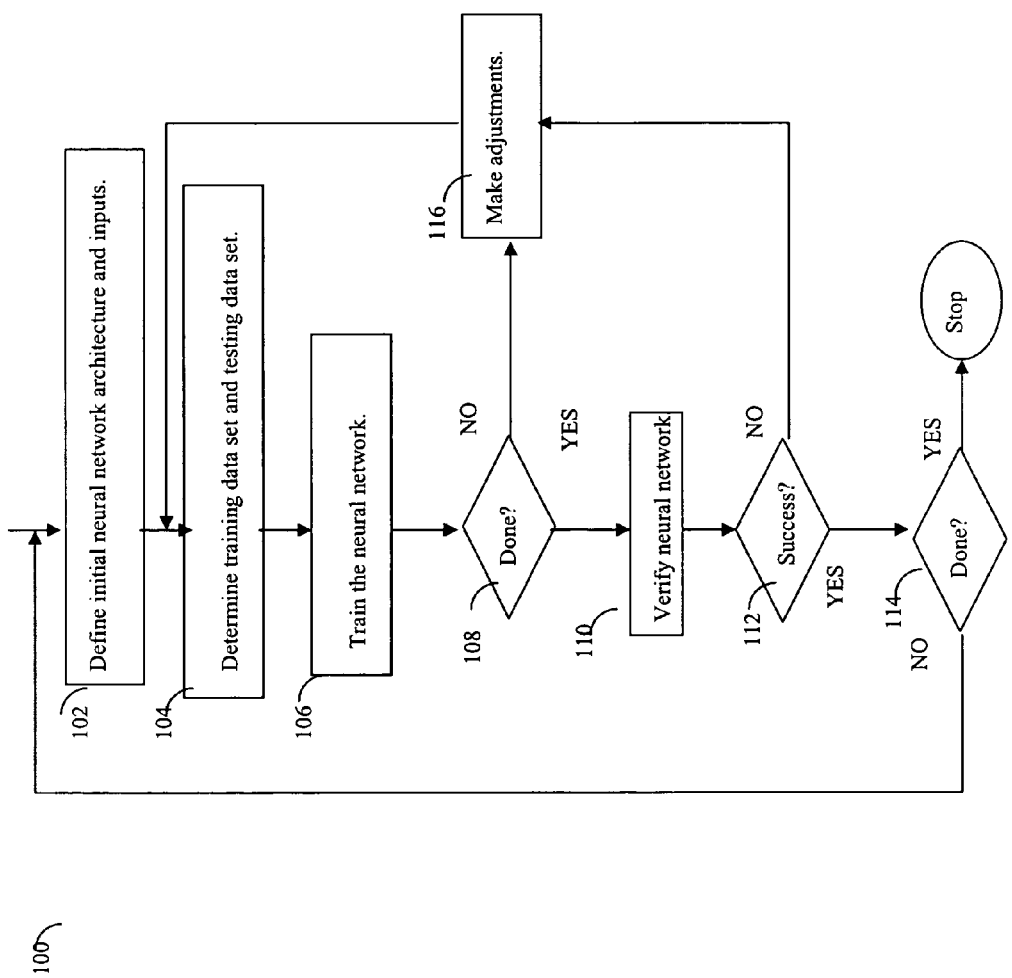
FIG. 2 is a flowchart of processing steps of one embodiment for producing a verified neural network.

Referring now to FIG. 2, shown is a flowchart of processing steps that may be performed in an embodiment using neural networks to produce a verified neural networks. Note that the processing steps of 100 as described herein provide for producing multiple neural networks. However, these steps may be performed for producing a single verified neural network as well and should not be construed as a limitation of the techniques described herein. The processing steps 100 of FIG. 2 may be performed off-line prior to using a system including a verified neural network. The techniques used herein in verification may be used in step 110 to verify each neural network using a reduced number of data points.

At step 102, a neural network architecture and associated inputs are defined. At step 104, a training data set and a testing data set are determined. At step 106, the neural network is trained. At step 108, a determination is made as to whether the training is complete. If not, adjustments to the neural network are made at step 116. These adjustments may include any one or more different adjustments that are known in the art including a variation in the architecture (such as redefining all or part of the architecture), values and functions used therein, particular inputs, and the like. Control proceeds to step 104. If step 108 determines that training is complete, control proceeds to step 110 to verify the neural network. At step 110, the neural network may be verified using the reduced number of M randomly selected data points as described herein. At step 112, a determination is made as to whether verification is successful. If not, control proceeds to step 116. Otherwise control proceeds to step 114 where a determination is made as to whether all neural networks have been constructed and verified. If so, processing stops. Otherwise control proceeds to step 102 to process the next neural network.

Figure 3:
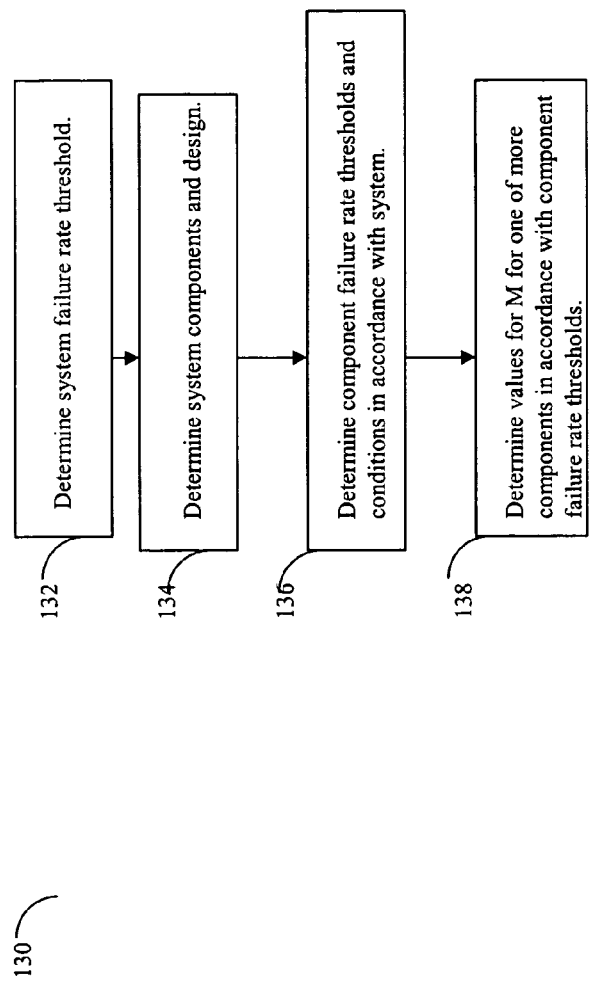
FIG. 3 is a flowchart of processing steps of one embodiment for verification of a system of components.

Referring now to FIG. 3, shown is a flowchart 130 of processing steps that may be performed using a system including one or more components which may be verified using the techniques described herein. The processing steps of 130 may be performed offline prior to use of the system. At step 132, a system failure rate threshold is determined. The system in this example may include multiple components connected in a variety of different ways in accordance with a particular application and embodiment. At step 134, the particular components, interconnections therebetween, and other aspects of the system design are determined. At step 136, component failure rate thresholds and conditions are determined for the different components and particular arrangement within the system. An example of how a system requirement or threshold may be mapped to a component level threshold is described elsewhere herein. It should be noted that the different failure rate threshold of each component may also take into account the particular arrangement and interconnections between components. For example, as described elsewhere herein, if a component produces an output that as then filtered, the component may have a different threshold than if the output is not filtered. With a filter, multiple consecutive bad values or outputs produced by the component may be required prior to determining that the component is not verified as correct. In contrast, if no filter is used, a single bad output may indicate that the component is not verified as correct. Control proceeds to step 138 where a value of M is determined for each component in accordance with the component failure rate thresholds and desired accuracies. These component-specific M values may be used as needed in verification of the individual components.

Figure 4:
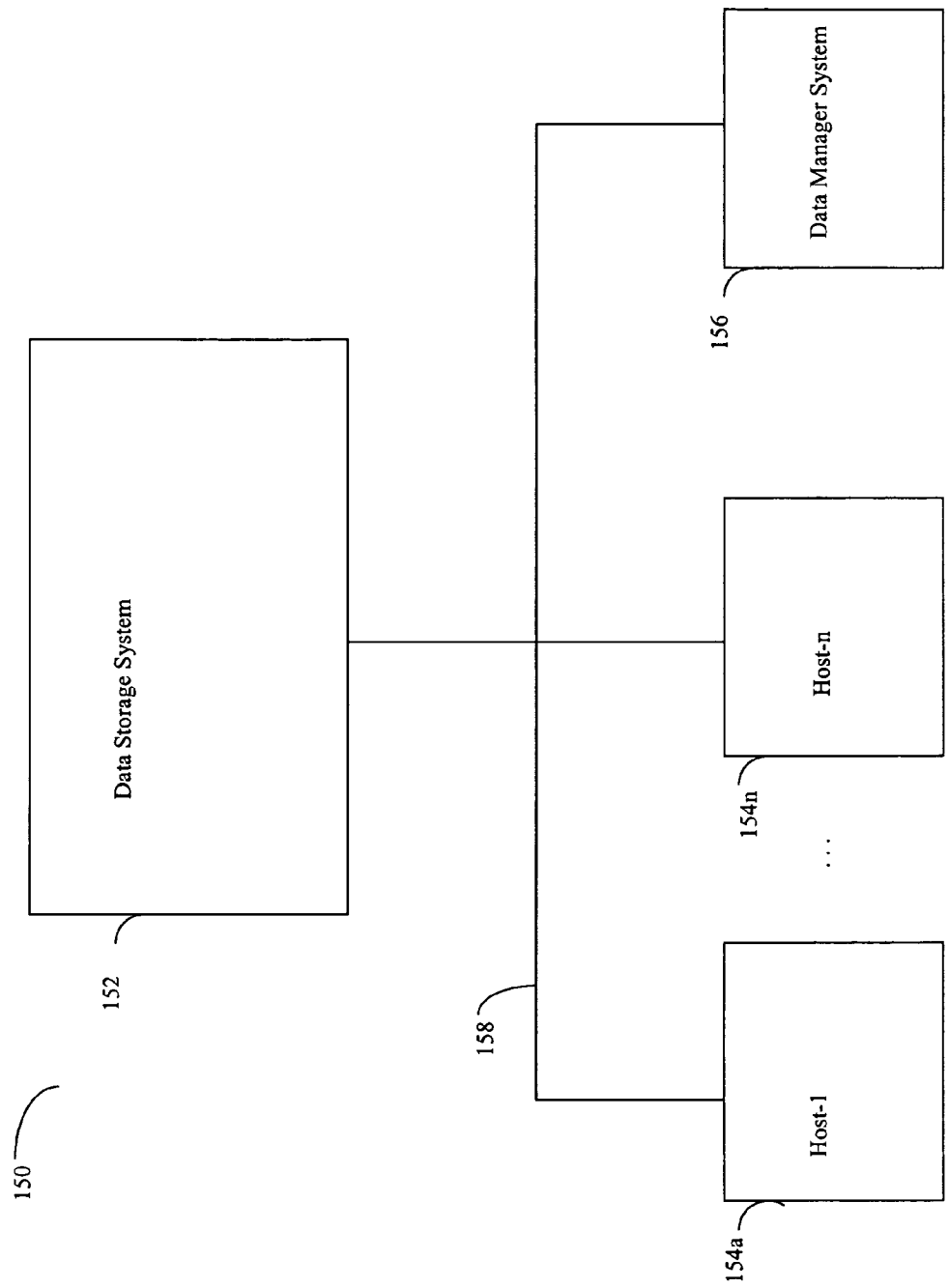
FIG. 4 is an example of a computer system in which the verification processing described herein may be executed.

Referring now to FIG. 4, shown is an example of an embodiment of a computer system in which the foregoing interpolation technique may be executed. The computer system 150 includes a data storage system 152 connected to host systems 154a-154n, and a data manager system 156 through communication medium 158. In this embodiment of the computer system 150, the N hosts 154a-154n and the data manager system 156 may access the data storage system 152, for example, in performing input/output (I/O) operations or data requests. The communication medium 158 may be any one of a variety of networks or other type of communication connections as known to those skilled in the art. The communication medium 158 may be a network connection, bus, and/or other type of data link, such as a hardwire or other connections known in the art. For example, the communication medium 158 may be the Internet, an intranet, network or other connection(s) by which the host systems 154a-154n, and the data manager system may access and communicate with the data storage system 152, and may also communicate with others included in the computer system 150.

Each of the host systems 154a-154n, the data manager system 156, and the data storage system 152 included in the computer system 150 may be connected to the communication medium 158 by any one of a variety of connections as may be provided and supported in accordance with the type of communication medium 158. The processors included in the host computer systems 154a-154n and the data manager system 156 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 154a-154n and the data manager system 156, as well as those components that may be included in the data storage system 152 are described herein in more detail, and may vary with each particular embodiment. Each of the host computers 154a-154n, as well as the data manager system 156, may all be located at the same physical site, or, alternatively, may also be located in different physical locations. Examples of the communication medium that may be used to provide the different types of connections between the host computer systems, the data manager system, and the data storage system of the computer system 150 may use a variety of different communication protocols such as SCSI, Fibre Channel, or GIGE (Gigabit Ethernet), and the like. Some or all of the connections by which the hosts, data manager system 156 and data storage system 152 may be connected to the communication medium 158 may pass through other communication devices, such as switching equipment including, for example, a phone line, a repeater, a multiplexer or even a satellite.

Each of the host computer systems as well as the data manager system may perform different types of data operations in accordance with different tasks executing in each of the hosts. In the embodiment of FIG. 3, any one or more of the host computers 154a-154n may be executing instructions to perform the foregoing verification techniques. The host may subsequently issue a data request to the data storage system 152 to perform a data operation, for example, to retrieve and/or store data used in the foregoing processing steps.

The data storage system may include any one or more data storage devices ranging from, for example, a single disk drive to a networked plurality of different types of data storage devices.

The instructions that may be executed by processors included in the host computers may be stored in any combination of hardware and/or software including, for example, machine executable instructions input from a read-only-memory (ROM), machine-language instructions stored on a data storage device in which the machine-language instructions have been generated using a language processor, software package, and the like.

Although the foregoing techniques may be used in connection with verification of neural networks, the foregoing verification techniques using the reduced number of M data points described herein are generally applicable for use with other applications and components.

While the invention has been disclosed in connection with preferred embodiment shown and described in detail, their modification and improvements thereon will become readily apparent to those skilled in the art. Accordingly, the spirit and scope of the present invention should be limited only by the following claims.

What is claimed is:

1. A computer program product, stored on a non-transitory computer-readable medium, that verifies accuracy of a component that is implemented from a model, the computer program product comprising code that:
receives a number of randomly selected samples, M, that result from at least one test of the component, for $$M \geq \frac{1}{\varepsilon} \ln\left(\frac{1}{\delta}\right),$$

wherein
δ represents a confidence value in the range 0<δ<1,
ε represents an accuracy level of p-est to its true value p, in the range 0<ε<1,
p represents a probability that a randomly selected point is in accordance with a selected criterion, F,
p-est, an estimate of p based on M randomly selected samples, is zero,
and a probability that (p≧ε) is equal to or less than δ;
determines if each of said randomly selected samples is not in accordance with said selected criterion, F; and
verifies accuracy of said component based on whether each of said randomly selected samples is in not in accordance with said selected criterion F.

2. The computer program product of claim 1, further comprising code that:
determines that said component is not verified as correct if any one of said selected samples is in accordance with said selected criterion F; and
determines that said component is verified as correct if all of said selected samples are not in accordance with said selected criterion, F.

3. The computer program product of claim 2, wherein said samples are points, the selected criterion F uses a function f(x) where x is one of said points corresponding to one or more neural network inputs, f(x) is a neural network output for a corresponding one of said points, and said selected criterion F is that f(x) evaluates to a value that exceeds predetermined bounds.

4. The computer program product of claim 2, wherein said samples are points, the selected criterion F uses an error function e(x) represented as:

$$e(x)=f(x)-\phi(x)$$

where x is one of said points corresponding to one or more neural network inputs, f(x) is a neural network output for a corresponding one of said points, φ(x) is an expected output for a corresponding one of said points, and wherein said selected criterion F is that e(x) evaluates to a value that exceeds predetermined bounds.

5. The computer program product of claim 2, wherein said component is one of: a neural network, a fuzzy logic model, a fuzzy logic classifier, and a statistical k-neighbor classifier.

6. The computer program product of claim 2, wherein said component is included in a system with at least one other component.

7. The computer program product of claim 6, wherein said component is a first component, and an output of a second component is used as an input to the first component, and the computer program product further comprising code that:

determines whether said first component is verified as correct in accordance with error that may be introduced by said second component's output.

8. The computer program product of claim 6, wherein said component is a first component, and accuracy of a second component is verified using said M samples, said second component producing an output which is an input to a third component, and the computer program product further comprising code that:

determines if each of said randomly selected samples is in accordance with said selected criterion, F for said second component; and determines that said second component is verified as correct unless a predetermined number, b, of said selected samples are in accordance with said selected criterion F, b being equal to or greater than 1.

9. The computer program product of claim 2, wherein said component is included in a system of an aircraft being evaluated in accordance with a certification.

10. The computer program product of claim 9, wherein δ and ε are both equal to or less than $10^{-6}$.

11. The computer program product of claim 10, wherein ε is equal to or less than $10^{-9}$.

12. A computer program product, stored on a non-transitory computer-readable medium, that determines a number of randomly selected data values for verification of a component that is implemented from a model, the computer program product comprising code that:

receives a value of zero for p-est, an estimate of p based on a random sample, p representing a probability that a randomly selected data value is in accordance with a selected criterion, F;

receives δ representing a confidence value in the range 0<δ<1;

receives ε representing an accuracy level of p-est to its true value p, in the range 0<δ<1, wherein a probability that (p≧ε) is equal to or less than δ; and determines said number of randomly selected data values, M, that result from at least one test of the component and are used for verification of the component, wherein M is determined in accordance with p-est=0, δ, and ε.

13. The computer program product of claim 12, wherein said component is a neural network.

14. The computer program product of claim 13, wherein said neural network is a feed forward static neural network.

15. The computer program product of claim 12, wherein M is determined according to one of: a Bernoulli analysis based on p-est=0 and a Bayesian analysis based on p-est=0.

16. The computer program product of claim 15, wherein M is determined according to said Bernoulli analysis and M is $$M \geq \frac{1}{\varepsilon}\ln\left(\frac{1}{\delta}\right).$$

17. The computer program product of claim 15, wherein M is determined according to said Bayesian analysis with a non-informative prior distribution, and M is $$M \geq \frac{1}{\varepsilon}\ln\left(\frac{1}{\delta}\right) - 1.$$

18. The computer program product of claim 15, wherein M is determined according to said Bayesian analysis using a family of parameterized prior probability density functions, and M is $$M \geq \frac{1}{\varepsilon}\ln\left(\frac{1+\delta}{\delta}\right) - 1.$$

* * * * *